United States Patent
Schneider et al.

(10) Patent No.: US 12,012,057 B2
(45) Date of Patent: Jun. 18, 2024

(54) POWER NETWORK FOR A MOTOR VEHICLE AND METHOD FOR OPERATING A POWER NETWORK FOR A MOTOR VEHICLE

(71) Applicants: AUDI AG, Ingolstadt (DE); Dr. Ing. h.c.F. Porsche Aktiengesellschaft, Stuttgart (DE)

(72) Inventors: Martin Schneider, Grossmehring (DE); Joerg Spiesshofer, Hepberg (DE); Tihomir Tomanic, Pfinztal (DE)

(73) Assignees: AUDI AG, Ingolstadt (DE); DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 312 days.

(21) Appl. No.: 17/436,489

(22) PCT Filed: Mar. 2, 2020

(86) PCT No.: PCT/EP2020/055428
§ 371 (c)(1),
(2) Date: Sep. 3, 2021

(87) PCT Pub. No.: WO2020/178233
PCT Pub. Date: Sep. 10, 2020

(65) Prior Publication Data
US 2022/0185209 A1  Jun. 16, 2022

(30) Foreign Application Priority Data
Mar. 5, 2019   (DE) .................... 10 2019 105 504.0

(51) Int. Cl.
*B60R 16/033*   (2006.01)
(52) U.S. Cl.
CPC ................................. *B60R 16/033* (2013.01)

(58) Field of Classification Search
CPC ........ B60R 16/033; B60R 16/03; H02J 1/082; H02J 2310/48; H02J 1/08
See application file for complete search history.

(56) References Cited

U.S. PATENT DOCUMENTS

| 2016/0290304 A1 | 10/2016 | Yukawa et al. |
| 2018/0001850 A1* | 1/2018 | Kontani ................ H02J 1/08 |

(Continued)

FOREIGN PATENT DOCUMENTS

| DE | 1561269 | * 6/2003 | ............... H02J 1/10 |
| DE | 10 2008 010 979 A1 | 8/2009 | |

(Continued)

OTHER PUBLICATIONS

First German Examination Report issued Jan. 13, 2020, in German Application No. 10 2019 105 504.0.
Second German Examination Report issued Jan. 29, 2021, in German Application No. 10 2019 105 504.0.
Third German Examination Report issued Jul. 20, 2021, in German Application No. 10 2019 105 504.0.

(Continued)

*Primary Examiner* — Carlos Amaya
(74) *Attorney, Agent, or Firm* — STAAS & HALSEY LLP (57) ABSTRACT

A power network for a motor vehicle includes a first partial power network connected to a supply potential, a second partial power network, and a coupling element which couples the second partial power network to the supply potential via the first partial power network. The coupling element has a reversible disconnect function, such that the coupling element reversibly decouples the first partial power network from the second partial power network based on a physical value of the first partial power network.

16 Claims, 4 Drawing Sheets

(56) References Cited

U.S. PATENT DOCUMENTS

| | | | |
|---|---|---|---|
| 2018/0262044 A1* | 9/2018 | Schipperges | H02J 1/08 |
| 2020/0216002 A1* | 7/2020 | Mazaki | H02J 7/1423 |

FOREIGN PATENT DOCUMENTS

| | | |
|---|---|---|
| DE | 10 2010 029 788 A1 | 12/2011 |
| DE | 10 2014 214 103 A1 | 1/2016 |
| DE | 10 2014 221 281 A1 | 4/2016 |
| DE | 10 2015 200 121 A1 | 7/2016 |
| DE | 10 2017 101 369 A1 | 7/2018 |
| DE | 10 2017 203 211 A1 | 8/2018 |
| DE | 10 2017 205 176 A1 | 10/2018 |
| DE | 10 2019 105 504.0 | 3/2019 |
| DE | 10 2018 216 491 B3 | 12/2019 |
| WO | WO 2004/042888 A1 | 5/2004 |
| WO | PCT/EP2020/055428 | 3/2020 |

OTHER PUBLICATIONS

International Search Report issued Jun. 9, 2020, in International Application No. PCT/EP2020/055428.

Third German Examination Report issued Jul. 20, 2021, in German Application No. 10 2019 504.0.

International Preliminary Report on Patentability issued Aug. 25, 2021, from International Application No. PCT/EP2020/055428 filed Mar. 2, 2020 (1 page).

Notification of Transmittal of Translation of the International Preliminary report on Patentability mailed Sep. 16, 2021, from International Application No. PCT/EP2020/055428 (1 page).

Written Opinion of the International Searching Authority dated Jun. 9, 2020, from International Application No. PCT/EP2020/055428 (4 pages).

* cited by examiner

POWER NETWORK FOR A MOTOR VEHICLE AND METHOD FOR OPERATING A POWER NETWORK FOR A MOTOR VEHICLE

CROSS-REFERENCE TO RELATED APPLICATIONS

This application is a U.S. national stage of International Application No. PCT/EP2020/055428, filed on Mar. 2, 2020. The International Application claims the priority benefit of German Application No. 10 2019 105 504.0 filed on Mar. 5, 2019. Both International Application No. PCT/EP2020/055428 and German Application No. 10 2019 105 504.0 are incorporated by reference herein in their entirety.

BACKGROUND

Described herein is a power network for a motor vehicle including a first partial power network, which is connected to a supply potential, a second partial power network and a coupling element, which couples the second partial power network to the supply potential via the first partial power network. Furthermore, also described herein is a method for operating such a power network.

In the vehicle technology, a power supply and an interconnection of individual partial power networks, thus for example of individual components, is called a power network or also an on-board power network of a motor vehicle. Generally, the power network can be divided into an abstract power network, also called a power distribution network, and a physical on-board network. Therein, the abstract power network describes a power distribution, power supply and power conversion for or by the components of the power network. By contrast, the real components, such as for example a wire harness, plugs, cables and the individual members, are described by the physical on-board network.

In order to avoid effects of a short circuit on a power distribution network, a method for detecting a short circuit in the electrical power distribution network, in which electrical power is provided from at least one electrical power source to at least one load, is known from German Patent Application No. 10 2017 201 488 A1. Therein, a mathematical method for detecting the short circuit is mainly described in this document.

Furthermore, a protective circuit for an electrical supply network of a motor vehicle is known from German Patent Application No. 10 2012 022 083 A1. Therein, a triggerable switch-off element is controlled upon a trigger signal of a control device to disconnect an electrical connection between a first terminal and a second terminal of the protective circuit. Therein, the electrical connection between the first and the second terminal by the switch-off element cannot again be provided by a control signal of the control device. In particular in case of an accident, which can for example be determined by use of an airbag control device, thus, a starter battery of the motor vehicle can for example be disconnected from the electrical supply network. Thereby, a danger of passengers and load of the motor vehicle can be prevented.

Finally, a method for controlling a multi-voltage on-board network of a motor vehicle is known from German Patent Application No. 10 2014 214 501 A1. Therein, a multi-voltage on-board network is an on-board network, which includes multiple partial networks with different network voltages. Now, in order to reduce effects of a short circuit in one of the partial networks on another one of the partial networks, a control unit is provided in this document, which can detect a short circuit between these partial networks and thereupon deactivate an affected component of the respective partial network.

SUMMARY

Aspects of the disclosure are directed to increasing an availability of a power network.

This may be achieved by the power network described herein and the method for operating such a power network described herein. Advantageous developments are also described herein.

A power network for a motor vehicle is described herein. The power network includes a first partial power network, which is connected to a supply potential, a second partial power network and a coupling element, which couples the second partial power network to the supply potential via the first partial power network. Therein, the coupling element has a reversible disconnect function. Thus, the coupling element is formed to reversibly decouple the first partial power network from the second partial power network depending on a physical value of the first partial power network.

Put another way, the described power network of the motor vehicle is formed such that the first partial power network and the second partial power network quasi represent sections of the power network physically separated from each other. The physical and thus electrically conductive connection of the two partial power networks is only effected via the coupling element. Therein, the coupling element has the mentioned reversible disconnect function. Thus, the electrical connection between the first partial power network and the second partial power network can be reversibly and in particular also non-destructively disconnected, but also be reestablished as needed.

Disconnecting or connecting, thus, coupling or decoupling, the first and the second partial power network, which can also be referred to as load units, is for example effected depending on the physical value. For example, disconnecting or connecting can also be effected depending on more than only one physical value, thus on multiple physical values. In particular, the two partial power networks are only decoupled if the physical value or values represent(s) a malfunction of the first partial power network. For example, an overload for example by a short circuit and/or increased total currents of the first partial power network can be a malfunction. Thus, the coupling element is quasi formed to capture and evaluate the physical value or values and to electrically disconnect or connect the first partial power network from or to the second partial power network depending on the result of evaluation.

Aspects of the disclosure are based on the realization that load reactions, thus defects in a partial power network, in particular a component of a partial power network, adversely affect not only the affected partial power network, but the entire power network and even can result in the failure of the entire power network in the worst case. Now, the partial power networks can be decoupled by the reversible coupling element in case of defect. Put another way, these load reactions can now be eliminated by the employment of the coupling element with reversible disconnect function in the main supply path. In case of a load reaction, which can be determined with the aid of the at least one physical value, the coupling element disconnects the partial power networks from each other. Thus, the load reaction cannot affect the entire power network, thus in particular the second partial power network.

Hereby, the advantage arises that a connection between the first and the second partial power network can be reestablished by the reversible disconnect function of the coupling element after eliminating the malfunction in the first partial power network, although the partial power networks have previously been physically disconnected from each other. In particular if the malfunction is a defect in a software for controlling the first partial power network, it can often be eliminated by restart of the partial power network or of a component of the partial power network during a drive operation of the motor vehicle. Thus, the malfunction would be eliminated, which the coupling element could determine by capturing the physical value, and the first partial power network could again be coupled to the second partial power network. By contrast, if the two partial power networks would have been irreversibly disconnected or decoupled in this case, a workshop would have had to be visited for exchanging a connecting line between the partial power networks or of the coupling element. Thus, in a configuration of the power network, a component-individual hardware reset (component reset) is for example quasi possible by the reversible disconnect function if the component and thus optionally the entire partial power network has "hung up", for example due to a software defect. Thereby, the availability of the motor vehicle can overall be increased.

Furthermore, cost and weight of the physical power network can be reduced by the employment of the coupling element with reversible disconnect function instead of for example fuses with irreversible disconnect function.

For example, the mentioned motor vehicle is configured as an automobile, in particular as a passenger car or truck, or as a passenger bus or motorbike. Therein, the motor vehicle can in particular be formed as an electric motor vehicle, hybrid vehicle or motor vehicle with internal combustion engine.

In particular, the first and the second partial power network can each be formed as individual electrical components and loads of the motor vehicle, respectively. Alternatively, both the first and the second partial power network can also include a plurality of individual components and loads, respectively. For example, the first partial power network can be formed as an infotainment system and/or radio or sound system control and/or navigation system and/or internal light control and/or trunk light control. By contrast, the second partial power network can for example be formed as a brake control system and/or steering system and/or light control and/or wiper control. Generally, the components of the partial power networks can also be control devices for various systems of the motor vehicle. Besides the components, the two partial power networks or partial power networks can for example also include at least one power source and/or a power storage and terminals for coupling to a power supply or a power storage, respectively. Furthermore, the two partial power networks can also include a cabling and/or terminals to further partial power networks and load units of the motor vehicle, respectively.

For example, a 12 volt supply voltage can be provided to the first and the second partial power network, respectively, via the mentioned supply potential.

In a particularly advantageous manner, the coupling element can also be formed to reversibly decouple the first partial power network from the second partial power network depending on a physical value of the power network, in particular of a supply path of the power network.

Additional embodiments, by which additional advantages arise, are also described herein.

An embodiment provides that the physical value of the first partial power network represents an electrical value and/or a temperature value.

Therein, an electrical value can for example be formed as a current or voltage value. For example, the physical value can represent a short circuit as the malfunction of the first partial power network, in particular of a component of the first partial power network. Thus, the two partial power networks can in particular be reversibly decoupled form each other if an increased current flow from the first partial power network to the second partial power network is captured by the coupling element. By contrast, overheating of the first partial power network can for example be indicated as the malfunction by the temperature value. Therein, a malfunction cannot only be a mechanical destruction of a member of the first partial power network, but also for example be caused by a hardware defect and/or a software defect in the control of the first partial power network.

Thus, the first partial power network can for example include at least one electrical load and at least one power source as the components. By contrast, the second partial power network can for example only include electrical loads as the components. Now, a physical value in the form of a current flow from the first partial power network to the second partial power network could be monitored by the coupling element. If a current value in the current flow would exceed or fall below a preset limit value, the coupling element could decouple the two partial networks. Thus, the power source of the first partial network could be prevented from being discharged by the components of the second partial network in the connected state of the partial networks such that sufficient power for operating the remaining components of the first partial network is in particular no longer available.

Alternatively, the first partial power network could be formed as a multi-voltage network. Thus, the first partial power network can itself include partial power networks respectively with own components, wherein the partial power networks in particular have different supply potentials. Thereby, the coupling element could also carry out the reversible decoupling of the first and the second partial network depending on a physical value of one of the partial networks of the first partial power network.

A further embodiment provides that the first partial power network includes at least one component not relevant to safety for providing a function of a motor vehicle. By contrast, the second partial power network includes at least one safety-relevant component for providing a function of a motor vehicle.

Put another way, the second partial power network can thus represent a partial power network required for safely operating the motor vehicle in the road traffic. The safety-relevant function of the second partial power network can for example be a driving function, a steering function, in particular a steering assistance function, and/or a braking function, in particular a braking assistance function, and/or a light function and/or a wiper function of the motor vehicle. By contrast, the first partial power network can be accordingly irrelevant to safely operating the motor vehicle and thus rather serves for comfort of an occupant of the motor vehicle. The function of the first partial power network not relevant to safety can for example be a navigation function and/or a function of a radio or sound system and/or an infotainment function and/or a lighting function in the interior of the motor vehicle or a trunk.

Thereby, the advantage arises that it is avoided that a malfunction of a component not relevant to safety affects the function of a safety-relevant component by the previously described load reaction. Thus, the power supply of safety-relevant components can be ensured, in particular according to ISO26262, wherein the vehicle availability can be maintained at the same time.

Put another way, a protection and an insulation of the safety-relevant components from the components not relevant to safety can be realized by the coupling element with reversible disconnect function. Overall, an abrupt, unheralded failure of safety-relevant electrical systems, such as for example of a steering assistance and/or a braking assistance, can thus be prevented.

Additionally or alternatively, it can also be provided that the first partial power network includes at least one safety-relevant component for providing a function of a motor vehicle and the second partial power network includes at least one component not relevant to safety for providing a function of a motor vehicle.

A further embodiment provides that the coupling element is formed as a DC/DC converter (direct current voltage converter) or as a switchable potential distributor.

Therein, the DC/DC converter is in particular also formed as a switchable DC/DC converter.

Therein, it is to be understood by switchable that the DC/DC converter or the potential distributor can be controlled to provide the reversible disconnect function. Thereto, both the DC/DC converter and the potential distributor can for example include a switching element such as for instance a semiconductor switch or a relay, which disconnects the connection between the first partial power network and the second partial power network depending on the physical value, thus for example on a current or a voltage. For example, the switchable DC/DC converter or the switchable potential distributor can also be referred to as intelligent DC/DC converter or intelligent potential distributor.

A further embodiment provides that the coupling element for providing the disconnect function includes at least one controllable switching element, a capturing device for capturing the physical value and a control device for generating a control signal depending on the physical value for controlling the switching element.

That is, the coupling element can quasi be used as an evaluation device to perform a diagnosis of the power network, thus of the physical on-board power network. Thus, the current and the voltage, respectively, can for example be ascertained, and the temperature can be measured, respectively, and thus also the energy or power consumption of a respective partial power network of the power network.

Therein, the mentioned capturing device can for example be formed as a current sensor, voltage sensor and/or temperature sensor. The control device can in particular be formed as a controller, such as for example a microcontroller. The switching element can for example be formed as a semiconductor switch. Therein, the semiconductor switch can for example be operated in a switching operation, that is, the semiconductor switch is electrically conductive in a turned on switching state and the semiconductor switch is not electrically conductive in a turned off switching state. For providing the reversible disconnect function, therein, the semiconductor switch can be controlled with the aid of the control device, in particular with the control signal of the control device depending on the physical value, and thereby be set either into the turned on or into the turned off switching state. Therein, the semiconductor switch can for example be formed as a field effect transistor, bipolar transistor, thyristor or the like.

A further embodiment provides that the coupling element is formed to decouple the first partial power network from the second partial power network depending on the physical value only if the physical value either exceeds or falls below a preset limit value. Analogously, it can be provided that if multiple physical values are captured, the coupling element can be formed to decouple the first partial power network from the second partial power network depending on the physical values only if the physical values either exceed or fall below a respectively associated, preset limit value.

Thus, if a voltage drop due to a short circuit in the first partial power network and a preset voltage limit value is for example determined by the coupling element, the coupling element can disconnect the first and the second partial power network from each other. Analogously, this of course also applies upon determination of an overvoltage in the power network. Therein, the limit value can thus in particular be a current limit value, a voltage limit value and/or a temperature limit value.

For example, a supply voltage, thus a voltage of at least 9.8 volts usually is to be provided on average for a normal operation of the second partial power network. If the voltage of the second partial power network drops below 9.8 volts for example for more than one second, the functionality of the second partial power network can be disturbed. Thus, the coupling element could disconnect the two partial power networks from each other in this case. If the voltage would further drop from 9.8 volts to less than 8.2 volts and this state would be maintained for example for more than 200 milliseconds, this could also entail a malfunction of the second partial power network. This analogously also applies to the case that the supply voltage drops to below 6 volts for more than 500 microseconds. Thus, the coupling element can for example provide the reversible disconnect function not only depending on the preset limit value, but in particular also depending on a preset time value. Analogously, this can for example also be effected for the current or the temperature of the power network. According to dimensioning of the power network, the first partial power network can be disconnected from the second partial power network upon determination of a current value of more than 300 amperes or for example more than 1000 amperes.

A further embodiment provides that the power network includes a low-voltage network and a high-voltage network, which are coupled to each other via a converter element. Therein, the high-voltage network is formed to supply the low-voltage network with power. Therein, the low-voltage network also includes the coupling element besides the first and the second partial power network.

Put another way, the power network is quasi formed as a multi-voltage power network, wherein the reversible disconnect function is only realized for the low-voltage network. Thus, the low-voltage network and the high-voltage network each represent an independent partial network of the power network.

This power network architecture is in particular used for modern motor vehicles with electric drive or hybrid drive. In the application, the designation "high-voltage network" relates both to so-called high-voltage power networks with a potential or a rated voltage of about 60 volts to about 1000 volts and to so-called medium-voltage power networks with a potential or a rated voltage of about 20 volts to about 60 volts, usually of about 48 volts. In contrast, the designation "low-voltage network" relates to a so-called low-voltage power network with a potential or a rated voltage of about less than or equal to 30 volts, usually with a rated voltage of about 12 volts. Therein, a high-voltage battery and for example an electric motor for the electric drive is in particular arranged in the high-voltage network. Thus, the high-voltage battery of the high-voltage network quasi supplies the first and the second partial power network of the low-voltage network.

A further embodiment provides that the high-voltage network is connected to the supply potential via the converter element.

For example, the converter element is formed as a DC/DC converter, which can convert a higher potential of the high-voltage network into a lower potential, thus the supply voltage for the partial power networks of the low voltage-network.

A further embodiment provides that a battery is associated with the second partial power network for power supply. In a normal operation of the power network, the first partial power network and the second partial power network are then supplied with power from the high-voltage network. However, in case that the first partial power network is reversibly decoupled from the second partial power network, the second partial power network is then supplied with power from the battery.

Put another way, the battery of the second partial power network is quasi charged from the high-voltage network, thus in particular the high-voltage battery of the high-voltage network, in the normal operation of the power network. Therein, that operation of the power network is to be understood by the normal operation in case a malfunction is not present. By contrast, if a malfunction of the first partial power network is determined and the first partial power network is accordingly disconnected from the second partial power network, the function of the second partial power network can now be ensured in that the battery of the second partial power network supplies the second partial power network with power. Thus, the second partial power network can at least temporarily supply itself with power.

Hereby, the advantage arises that in particular if the second partial power network is safety-relevant components of the power network, the motor vehicle can further be safely steered to a suitable placing location without for example a steering or braking assistance failing.

Optionally, an own battery can also be associated with the first partial power network such that the entire low-voltage network can still be operated even upon a failure of the high-voltage network.

Hereby, the advantage arises that the coupling element can thus also be employed for battery diagnosis, for example. For example, the coupling element can be employed for diagnosis of the battery of the first partial power network. Namely, a current and a voltage, respectively, provided by the battery can thus be captured and evaluated via the coupling element. Subsequently, a charging capacity of the battery and thereby an aging state of the battery can be inferred via the value of the current and the voltage, respectively.

Also described herein is a motor vehicle with a power network as described herein.

Also described herein is a method for operating a power network for a motor vehicle. Therein, the power network includes a first partial power network, which is connected to a supply potential, a second partial power network and a coupling element, which couples the second partial power network to the supply potential via the first partial power network. Therein, capturing a physical value of the first partial power network is first effected in an operation a). Subsequently, generating a control signal for the coupling element is effected depending on the physical value in an operation b). Finally, reversibly decoupling the first partial power network from the second partial power network is effected depending on the control signal in an operation c).

Therein, capturing the physical value can in particular be effected by use of a capturing device. Furthermore, the power network, thus in particular the coupling element, can also include a control device, which generates the control signal depending on the physical value, wherein a switching element of the coupling element can in particular be controlled by the control signal. By controlling this switching element, reversibly decoupling the two partial power networks can then be effected. Alternatively, the physical value itself can also represent the control signal. Thus, the coupling element can be directly controlled by the physical value for connecting or disconnecting the partial power networks.

Developments of the method described herein also belong to the disclosure, which includes features as they have already been described in context of the developments of the power network described herein. For this reason, the corresponding developments of the method are not again described here.

The disclosure also includes the combinations of the features of the described embodiments.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

The embodiments explained in the following are examples of the disclosure. In the embodiments, the described components of the embodiments each represent individual features which are to be considered independently of each other, and which also each develop the disclosure independently of each other. Therefore, the disclosure also is to include other combinations of the features of the embodiments than those represented. Furthermore, the described embodiments can also be supplemented by further ones of the already described features.

In the drawings, identical reference characters each denote functionally identical elements.

Figure 1:
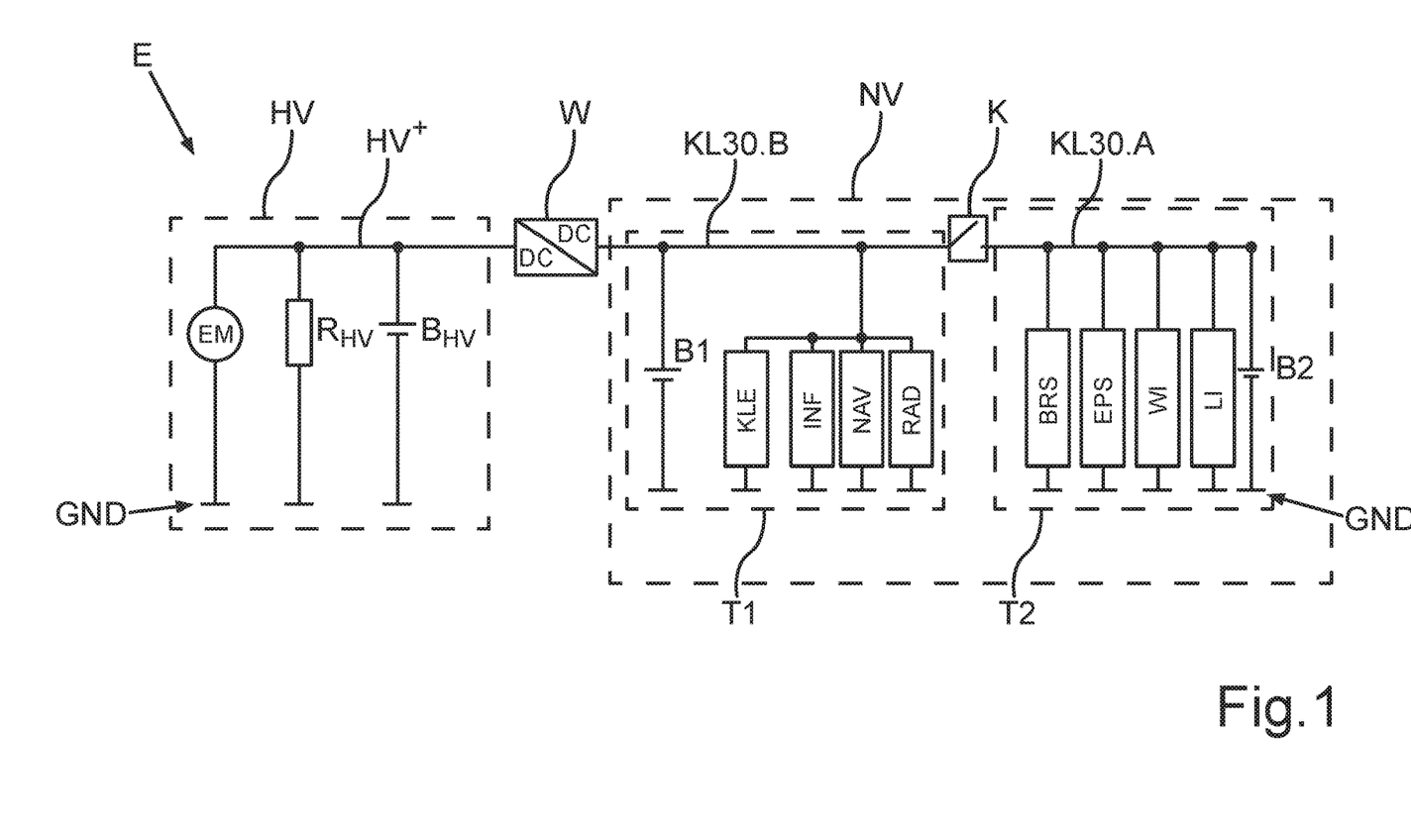
FIG. 1 is a schematic circuit diagram of a power network for a motor vehicle with manual driving function, with a first example configuration of a coupling element with reversible disconnect function.

FIG. 1 shows a schematic circuit diagram of an example embodiment of the power network described herein. The power network E, also called on-board power network, is in particular formed as a power network E of a motor vehicle with manual driving function. Therein, the power network E is divided into two voltage networks, namely a high-voltage network HV and a low-voltage network NV, wherein the two voltage networks are coupled to each other via a converter element W, namely a DC/DC converter (direct current voltage converter). Thus, the converter element can convert a higher potential of the high-voltage network HV of about 48 volts into a lower potential of the low-voltage network NV of about 12 volts, or vice versa. As initially described, the designation "high-voltage" in the application relates to both a high-voltage rated voltage of about 60 volts to 1000 volts, usually of about 400 volts to 900 volts, and to a medium-voltage rated voltage of about 20 volts to about 60 volts, usually of about 48 volts. By contrast, the designation "low-voltage" refers to a low-voltage rated voltage of about less than or equal to 30 volts, usually to a rated voltage of about 12 volts, in the application. In the drawings, the high-voltage network HV is in particular described as a medium-voltage power network with a potential of about 48 volts.

Therein, both voltage networks include a plurality of individual components, also called loads in the following. Besides a high-voltage battery $B_{HV}$, the high-voltage network HV includes a high-voltage load $B_{HV}$ and an electrical machine EM as the components. Therein, the components of the high-voltage network HV are connected to a positive potential HV+ with one terminal and to a ground potential GND with their respective second terminal. Then, a voltage, thus, the previously mentioned potential of about 48 volts, is for example applied between the ground potential GND and the positive potential HV+ of the high-voltage network HV. In an embodiment other than those shown, the high-voltage network HV could also have a potential of about 400 volts to 900 volts. In this case, the potential would then be applied between the positive potential HV+ and a negative potential HV− not shown in the drawings.

In contrast thereto, the components of the low-voltage network NV are divided into partial power networks, namely a first partial power network T1 and a second partial power network T2. In the embodiment shown in FIG. 1, the first partial power network T1 therein includes a plurality of components, such as for example a radiator fan element KLE, an infotainment system INF, a navigation system NAV as well as a radio control RAD. Additionally or alternatively, the first partial power network T1 could include a sound system control and/or an internal light control for the motor vehicle and/or a trunk. Furthermore, the first partial power network T1 can also include a battery B1 as the component in FIG. 1. Correspondingly, the components of the first partial power network T1 are formed as components not relevant to safety for providing a function of the motor vehicle. Alternatively to the shown embodiment, the first partial power network T1 could also only include a single component. Thus, the one component would then quasi represent the first partial power network T1.

In order to be supplied with electrical power, the battery B1 of the first partial power network T1 is connected to a supply potential KL30.B with one terminal. The battery B1 is also connected to the ground potential GND with a second terminal. The remaining components of the first partial power network T1 are also connected to the supply potential KL30.B with a respectively first terminal. Thereto, the individual first terminals of the remaining components are interconnected at a first node and thus form a common terminal, by which the remaining components are connected to the supply potential KL30.B. The remaining components of the first partial power network T1 are also connected to the ground potential GND with their respective second terminals.

Analogously to the first partial power network T1, the second partial power network T2 also includes a plurality of electrical components, such as for example a brake control system BRS, a steering system EPS, a wiper control WI, a light control LI and a battery B2. Correspondingly, the components of the second partial power network T2 are formed as safety-relevant components for providing a function of the motor vehicle. Therein, each of the components of the second partial power network T2 is connected to a second supply potential KL30.A via a separate first terminal. The individual components of the second partial power network T2 are connected to the ground potential GND with a respectively second terminal.

Therein, a supply voltage for the first and the second partial power network T1 and T2, namely the previously mentioned low-voltage potential of about 12 volts, is applied both between the supply potential KL30.B and the ground potential GND and between the supply potential KL30.A and the ground potential GND. For example, the supply potentials KL30.B and KL30.A represent a supply of the partial power networks with steady plus, which is often referred to as "terminal thirty" in the vehicle technology.

Besides the first and the second partial power network T1 and T2, the low-voltage network NV also includes a coupling element K. Therein, the coupling element couples the first partial power network T1 to the second partial power network T2. In the embodiment shown in FIG. 1, the coupling element K is thereto connected to the supply potential KL30.B via a first terminal and to the second supply potential KL30.A via a second terminal. Therein, the coupling element K has the function to decouple the first partial power network T1 from the second partial power network T2 for example in case of a malfunction of the first partial power network T1, thus in particular of one of the components of the first partial power network T1. Thus, the first partial power network T1 and the second partial power network T2 can be reversibly and non-destructively physically disconnected from each other in case of a malfunction.

Alternatively to the embodiment shown in FIG. 1, the first partial power network T1 could also include the converter element W and the components of the high-voltage network HV besides the previously described components. Thus, the coupling element K could also decouple the second partial power network T2 from the first partial power network T1 depending on at least one physical value of the converter element W and/or of one of the components of the high-voltage network HV.

The following situation can demonstrate the embodiment shown in FIG. 1. In a normal operation of the power network E, the high-voltage battery $B_{HV}$ of the high-voltage network HV can first be formed to also supply the components of the first partial power network T1 and of the second partial power network T2 of the low-voltage network NV via the converter element W besides the high-voltage loads $B_{HV}$ and the electrical machine EM. Therein, the battery B1 and the battery B2 of the first and the second partial power network T1 and T2 are also for example charged with the aid of the high-voltage battery $B_{HV}$. Thereto, the supply potentials KL30.B and KL30.A of the first and the second partial power network T1 and T2 are first electrically conductively connected to each other via the coupling element K in the normal operation.

Now, one of the components, such as for example the infotainment system INF of the first partial power network T1, could have a malfunction for example in the form of a short circuit. The voltage of the low-voltage network NV could collapse by the short circuit. Thus, the short circuit in the infotainment system INF could cause a so-called load reaction for all of the other components of the low-voltage network. By this load reaction, namely the voltage collapse or also voltage drop, thus, sufficient voltage for operating the remaining components of the first partial power network T1 and the components of the second partial power network T2 would no longer be provided. Thus, both the components of the first partial power network T1 and the components of the second partial power network T2 would no longer be functional. Thus, the entire low-voltage network NV of the power network E would overall fail.

If the motor vehicle, with which the power network E is associated, would therein for example be in a drive operation, the motor vehicle could no longer be controlled by failure of the safety-relevant components of the second partial power network T2. Thus, a steering assistance and/or a braking assistance for example would abruptly fail such that the motor vehicle could only be braked and steered, respectively, with considerable effort. Furthermore, upon such a failure of the function of safety-relevant components, such as for example the steering system EPS or the brake control system BRS, the motor vehicle could also be immediately automatically stopped. The motor vehicle would break down. In particular in the road traffic, a risk of accident would thereby be increased.

Now, in order to prevent such a failure of the braking and steering assistance, respectively, or breakdown of the motor vehicle, the coupling element K of the power network E is formed for decoupling the components of the first partial power network T1 not relevant to safety and the safety-relevant components of the second partial power network T2. Therein, the coupling element has the reversible disconnect function for reversibly and non-destructively disconnecting the partial power networks T1 and T2. In order to realize the reversible disconnect function, the coupling element K can for example include a semiconductor switch, which is electrically conductive in a turned on switching state or electrically non-conductive in a turned off switching state or vice versa depending on a physical value of the first partial power network T1. Therein, the physical value represents a current and/or a voltage and/or a temperature of the first partial power network T1. Therein, the semiconductor switch is in particular set into the non-conductive switching state if the physical value is outside of a preset range of values. Put another way, the first partial power network T1 is quasi electrically disconnected from the second partial power network T2 if the physical value either exceeds or falls below a preset limit value.

In case of the previously mentioned short circuit in the infotainment system INF, thus, the previously described voltage collapse would arise in the first partial power network T1. This voltage collapse could for example be captured by the coupling element K and the semiconductor switch of the coupling element K could change its switching state to the effect that the first partial power network is electrically disconnected from the second partial power network. Alternatively, an increased current flow from the second partial power network T2 to the first partial power network T1 could also be captured by the coupling element K in case of the short circuit. In this case too, the semiconductor switch could disconnect the connection between the first partial power network T1 and the second partial power network T2.

By contrast, if a malfunction of the infotainment system INF would for example be caused due to a software defect in the control of the infotainment system INF, the infotainment system INF, thus in particular the infotainment control, could for example overheat. The overheating of the infotainment system INF could also be captured by the coupling element K. Now, in order to avoid for example a mechanical destruction of the infotainment system INF following overheating, and to counteract a load reaction to the safety-relevant components of the second partial power network T2 resulting from it, the coupling element K could already early electrically disconnect the first partial power network T1 and the second partial power network T2 from each other in this case too. Subsequently, a restart of the infotainment system control could be executed for example for eliminating the malfunction of the infotainment system INF. Thereby, the software defect in the control of the infotainment system INF could be eliminated and the infotainment system INF would again be functional after the restart. The temperature of the infotainment system INF would decrease and the physical value of the first partial power network would again be in the preset range of values. Accordingly, the first partial power network could again be coupled to the second partial power network T2 by the coupling element K. Thus, the availability of the motor vehicle could be improved with the power network described in FIG. 1.

As long as the two partial power networks T1, T2 are disconnected from each other during the malfunction, the components of the second partial power network T2 can be at least temporarily supplied with power with the aid of the battery B2. This analogously also applies to the battery B1 of the first partial power network in case that the high-voltage network HV for example fails.

Figure 2:
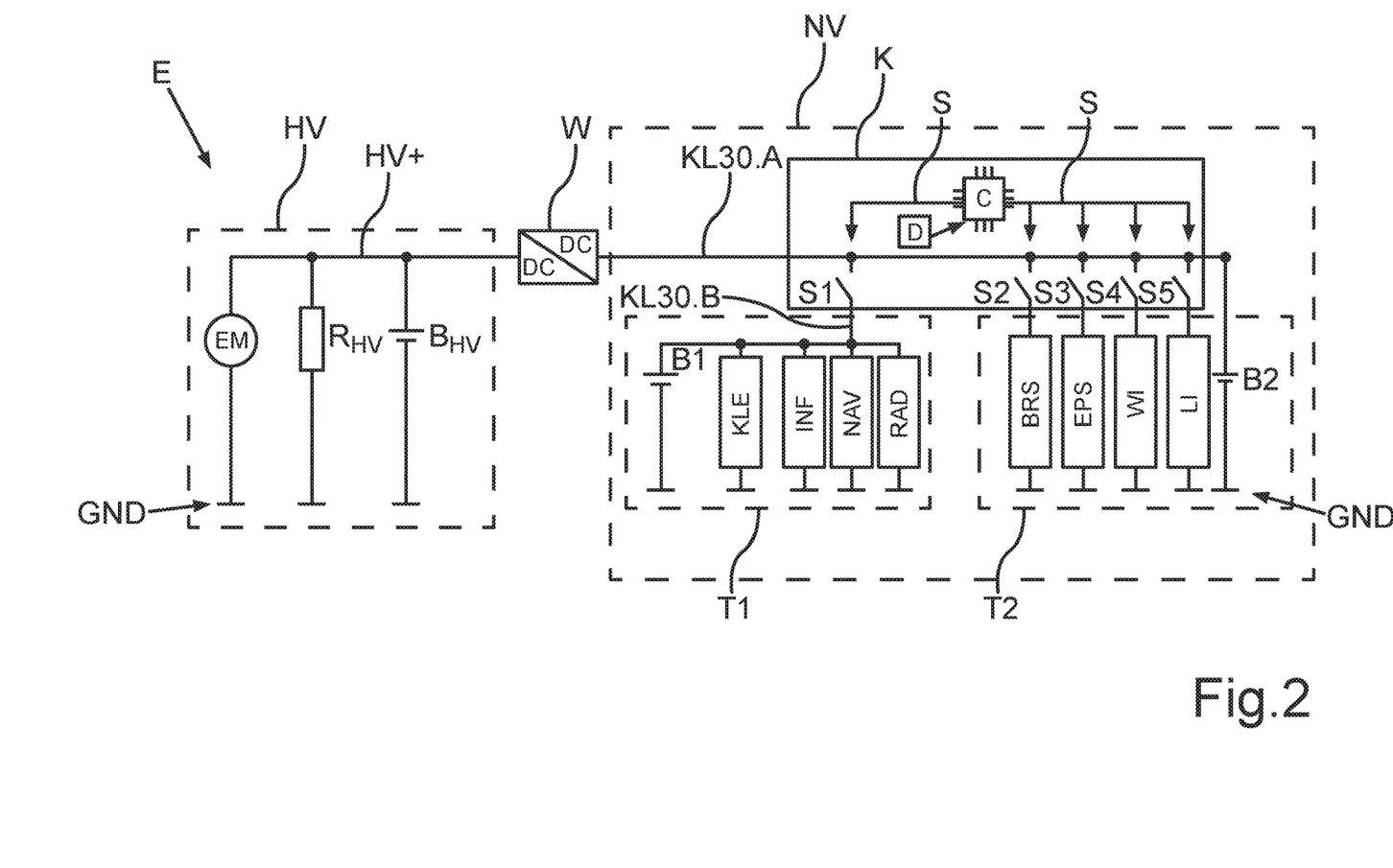
FIG. 2 is the schematic circuit diagram of a power network for the motor vehicle with manual driving function as illustrated in FIG. 1, with a second example configuration of a coupling element with reversible disconnect function.

FIG. 2 also shows the schematic circuit diagram of the power network E as it is illustrated in FIG. 1. However, an alternative configuration of the coupling element K is illustrated in FIG. 2. In the embodiment shown in FIG. 2, not only the entire partial power network T1 can be disconnected from the entire partial power network T2, thus the supply potential KL30.B from the second supply potential KL30.A, by the coupling element K. Instead, each of the components can be separately disconnected from the supply potential KL30.A except for the battery B2. Thereto, the coupling element K includes a plurality of switching elements S1 to S5. The switching element S1 is connected between the supply potential KL30.A and the supply potential KL30.B, wherein the common terminal of the components of the first partial power network T1 not relevant to safety is connected to the supply potential KL30.B. In FIG. 2, the optional battery B2 is also connected to the common terminal of the components of the first partial power network T1 not relevant to safety. Analogously thereto, the switching elements S2, S3, S4 and S5 are arranged between the respective first terminal of the brake control system BRS, of the steering system EPS, of the wiper control WI and of the light control LI and the supply potential KL30.A. Thus, each of the mentioned components can be separately connected to or disconnected from the supply potential KL30.A by controlling the switching elements S1 to S5.

Furthermore, the coupling element also includes a capturing device D in the embodiment shown in FIG. 2, by use of which the physical value or also individual physical values of each individual one of the components of the first and the second partial power network T1, T2 can be captured. Then, the captured physical value can be communicated from the capturing device D to a control device C. The control device C is for example formed to evaluate the physical value and quasi to examine if the physical value is in the preset range of values. If the physical value of one of the components, for example of the components of the first partial power network T1 not relevant to safety, is outside of the preset range of values, the control device C can generate a respective control signal S to control the switching element S1 to S5 associated with the component. By controlling the switching element, the malfunctioned component can finally be disconnected from the supply potential KL30.A.

Figure 3:
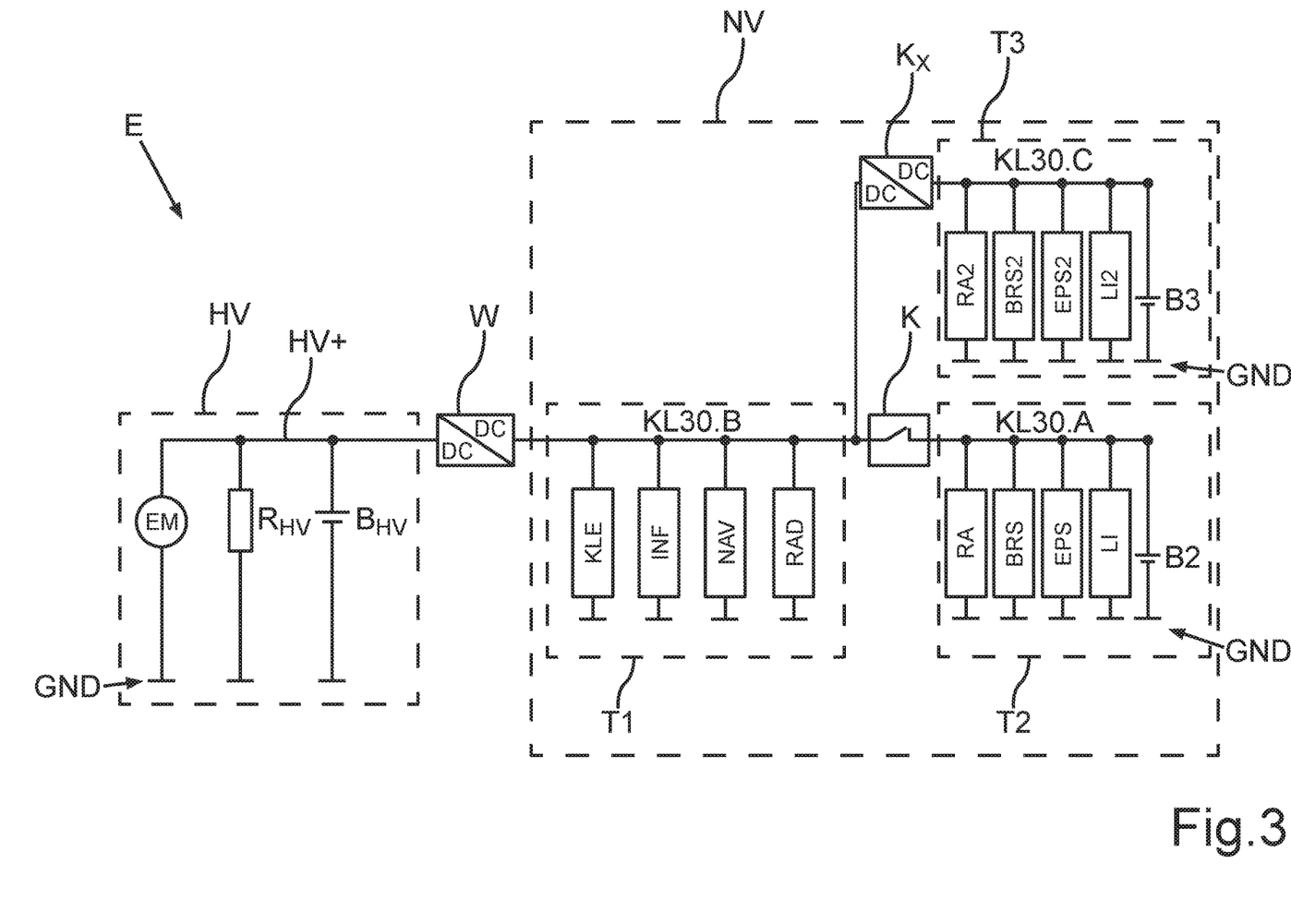
FIG. 3 is a schematic circuit diagram of a power network for a motor vehicle with highly-automated driving function and an example configuration of the coupling element with reversible disconnect function.

FIG. 3 shows a schematic circuit diagram of a power network E for a motor vehicle with a highly-automated driving function. Therein, the high-voltage network HV, the first partial power network T1 and the second partial power network T2 are constructed analogously to the embodiment of the power network E shown in FIG. 1 and FIG. 2. However, the second partial power network T2 includes a radar system RA as the component instead of the wiper control WI.

However, in addition to the second partial power network T2 with the safety-relevant components, the power network E additionally includes a third partial power network T3 for allowing the highly-automated driving function of the motor vehicle in the embodiment shown in FIG. 3. Therein, the third partial power network T3 includes electrical components, which execute the same function as the electrical components of the second partial power network T2. Thus, the third partial power network T3 is formed redundantly to the second partial power network T2.

Correspondingly, the third partial power network T3 includes a second radar system RA2, a second brake control system BRS2, a second steering system EPS2 and a second light control LI2. Furthermore, the third partial power network T3 also includes a battery B3. Therein, the battery B3 allows at least temporarily supplying the remaining components of the third partial power network T3 analogously to the battery B2 in case that the third partial power network T3 is decoupled from the first partial power network T1. Therein, analogously to the components of the second partial power network T2, all of the components of the third partial power network T3 are connected to a third supply potential KL30.C with each one first terminal and to the ground potential GND with a respective second terminal. In this case, approximately a potential of 12 volts is also applied between the second supply potential KL30.C and the ground potential GND. Analogously to the second partial power network T2, the third partial power network T3 is also connected to the supply potential KL30.B via a second coupling element Kx.

However, in the embodiment shown in FIG. 3, the coupling elements K and KX differ in their configuration. The coupling element K between the first partial power network T1 and the second partial power network T2 is for example formed as an intelligent potential distributor analogously to the coupling element in FIG. 1 and FIG. 2. In contrast thereto, the coupling element KX between the first partial power network T1 and the third partial power network T3 is formed as a controllable DC/DC converter. Thus, the coupling elements are also formed redundantly to each other.

Alternatively to the embodiment shown in FIG. 3, the coupling elements K and KX can also be identically formed. However, it is often the case that different battery technologies are used for the batteries B2 and B3 of the second partial power network T2 and the third partial power network T3 in a power network E for allowing a highly-automated driving function. Thus, in order to now be able to adjust different voltage levels depending on the used battery technology in the second partial power network T2 and the third partial power network T3, different coupling elements K and KX may be provided for realizing the reversible disconnect function in this case.

In case that a malfunction thus occurs in one of the components of the first partial power network T1 not relevant to safety in the embodiment shown in FIG. 3, the second and the third partial power network T2 and T3 can now also be separately decoupled from the first partial power network T1 for avoiding the load reaction.

Figure 4:
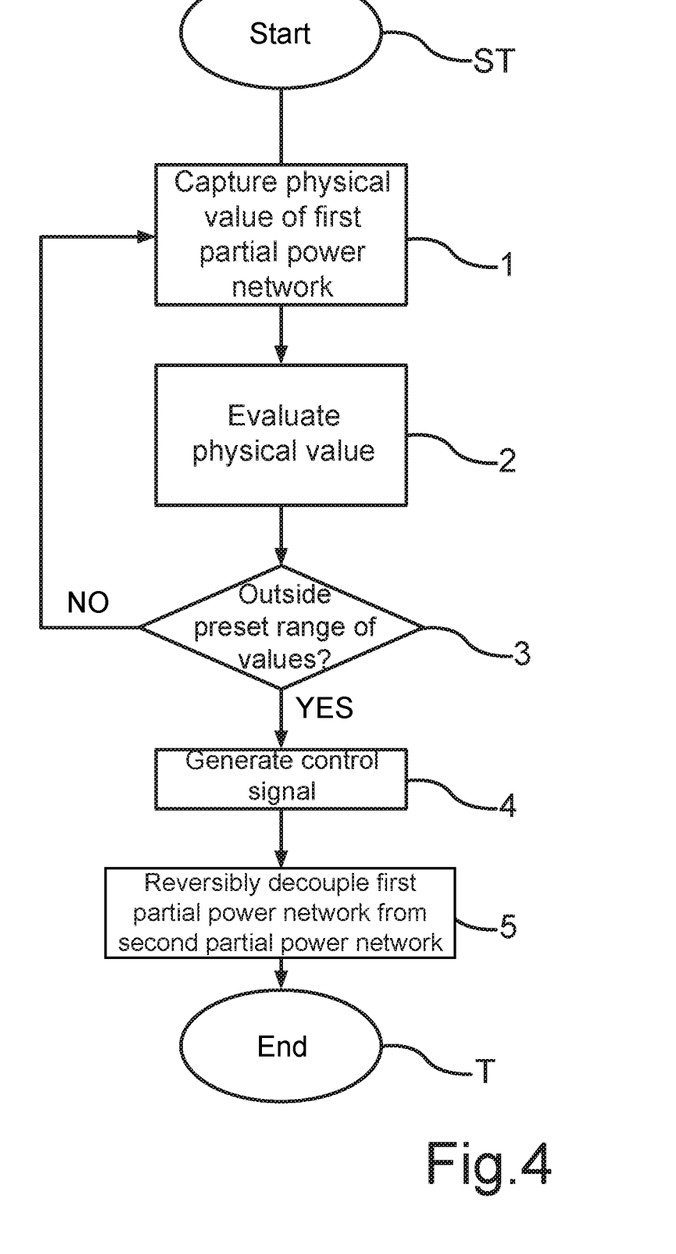
FIG. 4 is a schematic flow diagram with individual method operations for operating a power network, which includes a coupling element with reversible disconnect function.

FIG. 4 now shows a schematic flow diagram of individual method operations for operating an example embodiment of a power network as it is for example illustrated in one of FIGS. 1 to 3.

Therein, the method is started with a start operation ST. Subsequently, capturing the physical value of the first partial power network T1 is effected in a first operation 1. In a next operation 2, the captured physical value can then be evaluated. Thereupon, examining if the physical value is within or outside of a preset range of values is effected in an operation 3. If the physical value is within the preset range of values, next, operation 1 of capturing a new physical value of the first partial power network T1 can again be performed. By contrast, if the physical value is outside of the preset range of values, a control signal for the coupling element K, in particular for a switching element S1 to S5 of the coupling element K, is generated in an operation 4. Subsequently, the coupling element K or the respectively associated switching element S1 to S5 can be controlled with the control signal S to allow reversibly decoupling the first partial power network T1 from the second partial power network T2 or from the third partial power network T3. Subsequently, the method is terminated in an operation T.

Overall, the examples show how a high-availability power network, in particular a power network architecture, both for manually driving and for highly-automated driving can be provided.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in Superguide v. DIRECTV, 358 F3d 870, 69 USPQ2d 1865 (Fed. Cir. 2004). By way of example, the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The invention claimed is:

1. A power network for a motor vehicle, comprising:
   a first partial power network, connected to a supply potential, the first partial power network being not relevant to safety in operating the motor vehicle in road traffic;
   a second partial power network relevant to the safety and not redundant with the first partial power network; and
   a coupling element to couple the second partial power network to the supply potential via the first partial power network, the coupling element including a reversible disconnect function such that the coupling element is configured to reversibly decouple the first partial power network from the second partial power network, based on a physical value of the first partial power network.

2. The power network according to claim 1, wherein the physical value of the first partial power network represents at least one of an electrical value and a temperature value.

3. The power network according to claim 1, wherein
the first partial power network includes at least one electrical component which is configured to not be relevant to the safety to provide a function of the motor vehicle, and
the second partial power network includes at least one electrical component which is configured to be relevant to the safety to provide a function of the motor vehicle.

4. The power network according to claim 1, wherein the coupling element includes a DC/DC converter or a switchable potential distributor.

5. The power network according to claim 1, wherein the coupling element includes:
a switching element,
a capturing device configured to capture the physical value, and
a control device configured to generate a control signal based on the physical value, to control the switching element.

6. The power network according to claim 1, wherein the coupling element is configured to decouple the first partial power network from the second partial power network based on the physical value if the physical value either exceeds or falls below a preset limit value.

7. The power network according to claim 1, further comprising:
a low-voltage network and a high-voltage network, wherein
the low-voltage network and the high-voltage network are coupled to each other via a converter element,
the high-voltage network is configured to supply the low-voltage network with power, and
the first partial power network, the second partial power network, and the coupling element are included in the low-voltage network.

8. The power network according to claim 7, wherein the high-voltage network is connected to the supply potential via the converter element.

9. The power network according to claim 7, wherein
the second partial power network includes a battery for power supply,
in a normal operation of the power network, the first partial power network and the second partial power network are supplied with power from the high-voltage network, and
when the first partial power network is reversibly decoupled from the second partial power network, the second partial power network is supplied with power from the battery.

10. A method for operating a power network for a motor vehicle, wherein the power network includes a first partial power network connected to a supply potential, the first partial power network being not relevant to safety in operating the motor vehicle in road traffic, a second partial power network relevant to the safety and not redundant with the first partial power network, and a coupling element to couple the second partial power network to the supply potential via the first partial power network, the method comprising:
capturing a physical value of the first partial power network;
generating a control signal to be provided to the coupling element, based on the physical value; and
reversibly decoupling the first partial power network from the second partial power network, based on the control signal.

11. The method according to claim 10, wherein the physical value of the first partial power network represents at least one of a current value, a voltage value, and a temperature value.

12. The method according to claim 10, wherein
the first partial power network includes at least one electrical component which is configured to not be relevant to the safety to provide a function of the motor vehicle, and
the second partial power network includes at least one electrical component which is configured to be relevant to the safety to provide a function of the motor vehicle.

13. The method according to claim 12, wherein
the at least one electrical component which is configured to not be relevant to the safety includes at least one of a radiator fan element, an infotainment system, a navigation system, and a radio control, and
the at least one electrical component which is configured to be relevant to the safety includes at least one of a brake control system, a steering system, a wiper control, a radar system, and a light control.

14. The method according to claim 10, further comprising:
in response to reversibly decoupling the first partial power network from the second partial power network, supplying power to components of the second partial power network by a battery included in the second partial power network.

15. The method according to claim 10, further comprising:
in response to capturing the physical value, determining whether the physical value is outside a preset range of values; and
generating the control signal to be provided to the coupling element when the physical value is determined to be outside the preset range of values.

16. A motor vehicle, comprising:
a chassis; and
a power network, including:
a first partial power network, connected to a supply potential, the first partial power network being not relevant to safety in operating the motor vehicle in road traffic,
a second partial power network relevant to the safety and not redundant with the first partial power network, and
a coupling element to couple the second partial power network to the supply potential via the first partial power network, the coupling element including a reversible disconnect function such that the coupling element is configured to reversibly decouple the first partial power network from the second partial power network, based on a physical value of the first partial power network.

* * * * *

UNITED STATES PATENT AND TRADEMARK OFFICE
CERTIFICATE OF CORRECTION

| | |
|---|---|
| PATENT NO. | : 12,012,057 B2 |
| APPLICATION NO. | : 17/436489 |
| DATED | : June 18, 2024 |
| INVENTOR(S) | : Martin Schneider et al. |

It is certified that error appears in the above-identified patent and that said Letters Patent is hereby corrected as shown below:

In the Claims

Column 14, Line 57:
IN Claim 1, delete "network," and insert --network--.

Column 16, Line 48:
IN Claim 16, delete "network," and insert --network--.

Signed and Sealed this
Fifteenth Day of October, 2024

Katherine Kelly Vidal
*Director of the United States Patent and Trademark Office*